United States Patent
Loutfy et al.

(10) Patent No.: US 6,949,304 B2
(45) Date of Patent: Sep. 27, 2005

(54) FULLERENE-BASED ELECTROLYTE FOR FUEL CELLS

(75) Inventors: Raouf O. Loutfy, Tucson, AZ (US); Perumal Pugazhendhi, Tucson, AZ (US); Ken Tasaki, Goleta, CA (US); Arunkumar Venkatesan, Santa Barbara, CA (US)

(73) Assignees: MC Research & Innovation Center, CA (US); Materials and Electrochemical Resarch (MER) Corp., AZ (US)

( * ) Notice: Subject to any disclaimer, the term of this patent is extended or adjusted under 35 U.S.C. 154(b) by 0 days.

(21) Appl. No.: 10/867,380

(22) Filed: Jun. 12, 2004

(65) Prior Publication Data

US 2005/0014051 A1 Jan. 20, 2005

Related U.S. Application Data
(60) Provisional application No. 60/477,971, filed on Jun. 12, 2003, and provisional application No. 60/500,603, filed on Sep. 5, 2003.

(51) Int. Cl.[7] .............................................. H01M 8/10
(52) U.S. Cl. ......................................... 429/33; 429/30
(58) Field of Search ............................. 429/22, 30, 33, 429/38, 42, 44, 231.8, 218.1, 231.5, 232, 324, 40, 27, 219, 19, 3, 41, 312, 218.2, 231.2, 122, 303, 304, 314, 306, 330, 317, 10; 205/781; 361/504; 525/535; 210/490; 428/105; 423/447.2; 44/282; 585/27; 514/563; 548/417; 427/540; 29/623.5; 502/185, 101

(56) References Cited

U.S. PATENT DOCUMENTS

| | | | |
|---|---|---|---|
| 4,900,405 A | 2/1990 | Otagawa et al. ............ 205/781 |
| 5,748,438 A | * 5/1998 | Davis et al. ................. 361/504 |
| 5,834,566 A | 11/1998 | Helmer-Metzmann et al. ........................... 525/535 |
| 6,495,290 B1 | * 12/2002 | Hinokuma et al. ....... 429/231.8 |
| 6,523,699 B1 | 2/2003 | Akita et al. .................. 210/490 |
| 6,716,548 B1 | 4/2004 | Kaliaguine et al. ............ 429/33 |
| 6,726,963 B2 | * 4/2004 | Yamaura ..................... 427/540 |
| 6,824,908 B2 | * 11/2004 | Yamaura et al. .............. 429/33 |
| 2002/0004156 A1 | 1/2002 | Mizuno ........................ 429/33 |
| 2002/0058173 A1 | 5/2002 | Alberti et al. ................. 429/30 |
| 2002/0182506 A1 | * 12/2002 | Cagle ...................... 429/231.8 |
| 2003/0072991 A1 | 4/2003 | Matsubara et al. ............ 429/42 |
| 2003/0134179 A1 | 7/2003 | Gascoyne et al. ............. 429/44 |
| 2003/0232225 A1 | * 12/2003 | Manuyama et al. .......... 429/22 |
| 2004/0058123 A1 | 3/2004 | Cooper et al. .............. 428/105 |
| 2004/0086768 A1 | * 5/2004 | Fleckner et al. .............. 429/38 |

OTHER PUBLICATIONS

Saab, Andrew P. et al.; *Ionic Conductivity of $C_{60}$-Based Solid Electrolyte*, Fullerene Science and Technology, vol. 6, Issue 2, p. 227 (1998).

Kang, Moon–Sung et al., *Highly charged proton exchange members prepared by using water soluble polymer blends for fuel cells*, Journal of Membrane Science, Issue 247, p. 127 (2005) (www.sciencedirect.com).

(Continued)

*Primary Examiner*—Michael Barr
*Assistant Examiner*—Robert Hodge
(74) *Attorney, Agent, or Firm*—Cislo & Thomas LLP

(57) ABSTRACT

Proton conductive fullerene materials are incorporated in minor amounts into various polymeric materials to enhance the low relative humidity proton conductivity properties of the polymeric material. The resulting proton conductors may be used as polymer electrolyte membranes in fuel cells operative over a wide range of relative humidity conditions and over a wide range of temperatures from below room temperature to above the boiling point of water.

36 Claims, 3 Drawing Sheets

OTHER PUBLICATIONS

Hinokuma, Koichiro et al.; *Fullerene proton conductors*, Chemical Physics Letters, Issue 341, p. 442, (2001) (www.elsevier.nl/locate/cplett).

Hinokuma, Koichiro et al.; *Proton Conduction in Polyhydroxy Hydrogensulfated Fullerenes*, Journal of The Electrochemical Society, vol. 150, Issue 1, p. A112 (2003).

Chiang, Long Y et al.; *Efficient Synthesis of Polyhydroxylated Fullerene Derivatives via Hydrolysis of Polycyclosulfated Precursors*, Journal of the American Chemical Society (1994).

Shaffer, M.S.P. et al.; *Dispersion and Packing of Carbon Membranes*, Pergamon, vol. 36, No. 11, p. 1603 (1998, British publication).

Park, C., et al.; *Further Studies of the Interation of Hydrogen with Graphite Nanofibers*, Journal of the American Chemical Society, vol. 103, p. 572 (1999).

Saab et al., "Ionic Conductivity of $C_{60}$–Based Solid Electrolyte", Fullerene Science and Technology, 6 (2), pp. 227–242 (1998).

\* cited by examiner

FULLERENE-BASED ELECTROLYTE FOR FUEL CELLS

This application claims the benefit of U.S. Provisional Application No. 60/477,971, filed Jun. 12, 2003, and U.S. Provisional Application No. 60/500,603, filed Sep. 5, 2003.

This invention was made with Government support under Government Contract No. DAAD19-03-C-0024, awarded by the United States Department of Defense. The Government has certain rights in the invention.

FIELD OF THE INVENTION

The present invention relates to polymer electrolyte membranes for use in fuel cells, and more particularly, to the utilization of fullerene materials for enhancing the low relative humidity proton conductivity properties of such polymeric membranes.

BACKGROUND OF THE INVENTION

A steadily increasing demand for portable electric power has stimulated interest in the development of more efficient and more powerful fuel cell devices. A polymer electrolyte membrane (PEM) fuel cell is a strong candidate as a portable power source for commercial applications primarily because of its low weight and high power density.

The operation of a PEM fuel cell relies upon the proton conductivity properties of a polymeric membrane positioned between the two electrodes of the cell, to transport protons internally from one electrode to the other. The membrane must also have no electronic conductivity, good chemical and mechanical stability, and sufficient gas impermeability to prevent cross over of the fuel. For many years now, the membrane of choice has been a sulfonated perfluoro polymer known as Nafion®, commercially available from DuPont. Nafion is a copolymer of tetrafluoroethylene and perfluoro-3,6-dioxa-4-methyl-7-octenesulfonyl fluoride, available in acid or ionomer form.

The major drawback to Nafion as the ideal polymer electrolyte membrane in fuel cells is that its proton conductivity depends on the water content in the membrane, in which proton transport is based on the diffusion of hydronium ion ($H_3O^+$). In order to retain its high proton conductivity, Nafion membrane requires the use of pre-humidified gases at an operating temperature under 80° C. Such requirements considerably increase the cost, size and complexity of PEM fuel cells using Nafion. Nafion membranes cannot perform under dry or low relative humidity conditions nor above the boiling point of water, despite the faster chemical reaction and increased output that would result from the higher temperature. Furthermore, operating at the lower temperature required by Nafion increases the risk of carbon monoxide poisoning of the fuel cell catalyst.

Various attempts have been made to develop water-free proton conductive membranes for PEM fuel cells that do not have the low temperature and high relative humidity requirements of Nafion. One such attempt, for example, is described in the Hinokuma et al. U.S. Pat. No. 6,495,290, issued Dec. 17, 2002, incorporated herein by reference. The proton conductors employed by Hinokuma et al. are based on fullerene derivatives containing acidic functional groups such as —OH or —$SO_3H$, and are designed to operate under dry conditions over a wide range of temperatures. The proton conductors are described as being either compacted powder of the fullerene derivatives, or mixed with a small amount, generally 20 weight percent or less, of a film-forming polymeric material, such as polytetrafluoroethylene, polyvinylidene fluoride or polyvinyl alcohol. The patent cautions against employing the polymer in amounts any greater than 20 weight percent, at the risk of degrading the proton conductivity of the fullerene derivative. Furthermore, there is no hint in the Hinokuma et al. patent of using the fullerene derivative in combination with Nafion.

SUMMARY OF THE INVENTION

The present invention resides in the discovery that proton conductive fullerene materials, including but not limited to the fullerene derivatives described in the Hinokuma et al. U.S. Pat. No. 6,495,290, can be used in minor amounts, even as low as about 1% by weight, to enhance the low relative humidity proton conductivity properties of a variety of polymeric materials, even including Nafion itself. The proton conductive fullerene materials used in the present invention contain either bound water, or a plurality of functional groups with lone pair electrons, or a combination thereof, and may be incorporated into the polymeric material by doping or by mechanical mixing or by chemical reaction forming covalent bonds. The resulting proton conductors may be used as polymer electrolyte membranes in fuel cells operative over a wide range of relative humidity conditions and over a wide range of temperatures from below room temperature to above the boiling point of water.

The present invention includes the use of proton conductive fullerene materials to enhance the low relative humidity proton conductivity properties of polymeric materials. It also includes the proton conductors resulting from such use, as well as fuel cells employing such proton conductors.

DESCRIPTION OF PREFERRED EMBODIMENTS

Figure 1:
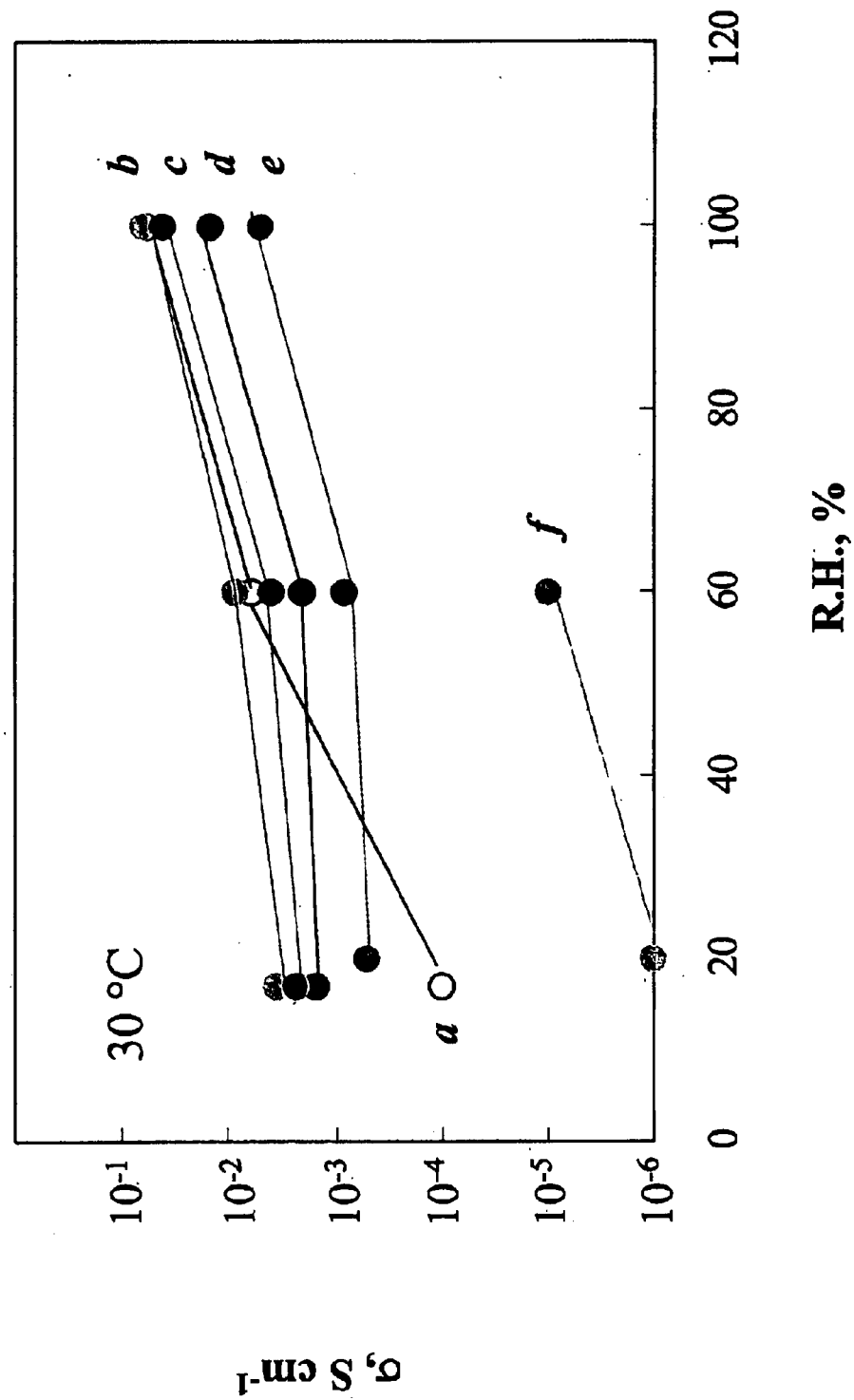
FIG. 1 is a graph showing the results of measuring the proton conductivities as a function of relative humidity at 30° C. of a bare Nafion membrane (plot a) in comparison with Nafion membrane doped with 1% by weight of various fullerene materials (plots b, c and d) and polyethylene oxide-fullerene materials composites (plots e and f).

In accordance with the present invention, proton conductive fullerene materials are employed to enhance the low relative humidity proton conductivity properties of polymeric materials for use as polymer electrolyte membranes in fuel cells. In this context, the term "low relative humidity" is used to signify relative humidities less than about 50%.

The proton conductive fullerene materials used in accordance with the present invention are fullerene materials containing bound water, or a plurality of functional groups with lone pair electrons, or a combination thereof. Fullerene materials containing a plurality of functional groups with lone pair electrons include, but are not limited to, all of the various fullerene derivatives described in the Hinokuma et al. U.S. Pat. No. 6,495,290, incorporated herein by reference, as having functional groups represented by the formula —XH where X is an arbitrary atom or atomic group having a bivalent bond, and more specifically by the formula —OH or —YOH where Y is an arbitrary atom or atomic group having a bivalent bond, and preferably the functional groups —OH, —OSO$_3$H, —COOH, —SO$_3$H or —OPO(OH)$_3$. Other functional groups with lone pair electrons include basic functional groups, such as —NH2, =NH and ≡N.

Fullerene materials containing bound water encompass just about all fullerene materials, with or without functional groups, even including C$_{60}$ itself. This is so because all fullerenes inherently contain a certain amount of bound water in their molecules which is extremely difficult to drive out in its entirety. In this respect, all fullerenes and fullerene derivatives are inherently water carriers capable of supporting some degree of proton transport through the diffusion of hydronium ions. This is independent of the proton hopping mechanism of proton transport between functional groups that is exhibited by the fullerene derivatives. For this reason, C$_{60}$ itself, even without functionalization, is included as a proton conductive fullerene material, and surprisingly has been found to be one of the preferred proton conductive fullerene materials for use in the present invention.

Other preferred proton conductive fullerene materials for use in the present invention are polyhydroxylated fullerene, polysulfonated fullerene and polyhydroxylated polysulfonated fullerene.

The present invention allows for significant flexibility in selection of the base polymeric material whose proton conductivity properties are to be enhanced by incorporation of the proton conductive fullerene materials. The selection will generally be made based upon the other requisite properties for a fuel cell polymer electrolyte membrane, such as no electronic conductivity, good chemical and mechanical stability, and sufficient gas impermeability to prevent cross over of the fuel. Since Nafion is well known to exhibit these properties and has long been the membrane of choice for PEM fuel cell applications, it is the logical preferred polymeric material for use in the present invention. Other preferred polymeric materials include sulfonated perfluoro polymers in general, polyethylene oxide, polystyrene and sulfonated polystyrene.

The requisite amount of proton conductive fullerene material to be incorporated into the polymeric material for enhancing the low relative humidity proton conductivity properties of the polymeric material, is surprisingly small, particularly in view of the negative teachings in this regard of the Hinokuma et al. U.S. Pat. No. 6,495,290, cautioning against adding polymer to fullerene derivatives in amounts any greater than 20 weight percent, at the risk of degrading the proton conductivity of the fullerene derivative. The present invention employs the reverse approach and adds the fullerene material to the polymer in a minor amount relative to the polymer. This amount will generally be less than about 30% by weight, and in most instances, within the range of from about 1 to about 10% by weight.

The actual incorporation of the fullerene material into the base polymeric material may be carried out in a variety of ways, depending upon the form of the starting materials. For example, if the base polymer is already in membrane or film form, such as the commercially available Nafion membrane, the fullerene material may be doped into the polymeric material by soaking the membrane in a doping solution of the fullerene material. Alternatively, the components may be mixed together in solution, for example, using supercritical CO$_2$, and then either casting a composite film or membrane, or evaporating the solvent to form a powder and then pelletizing the powder into a pelletized membrane. In some instances, it may be desirable to covalently link the fullerene material to the polymeric material through chemical reaction there-between.

Other additives may desirably be incorporated into the polymeric material in conjunction with the fullerene material. For example, when using a relatively high loading of fullerene that may cause the final membrane to become brittle, it may be desirable to add a brittleness inhibiting amount of a plasticizer for the polymeric material, such as low molecular weight polyethylene oxide, low molecular weight polyethylene imine, or carbon disulfide. Also, it may be desirable to aid the incorporation of the requisite amount of the fullerene material into the polymeric material by the addition of a fullerene-uptake adjuvant, such as silica, alumina or titania. Silica, in amounts up to about 10% by weight, has been found to be particularly suitable for this purpose.

The invention is further illustrated by way of the following examples.

EXAMPLE 1

Nafion 117 membrane obtained from DuPont was first boiled for 30 minutes with 3% hydrogen peroxide solution to remove organic impurities. The film was then rinsed several times with de-ionized water. The film was then boiled with 1M sulfuric acid for an hour to remove inorganic minerals. The membrane was again rinsed with de-ionized water and soaked in isopropyl alcohol until use. 1 wt % of dried C$_{60}$(OH)$_{12}$ was mixed with 0.8 g of Nafion ionomer solution obtained from DuPont. The wet membrane was soaked in a closed vial filled with this mixture of C$_{60}$(OH)$_{12}$ and Nafion ionomers for 24 hours. The membrane was then removed from the vial and dried in the vacuum oven. The resulting product was a Nafion membrane doped with 1 wt % C$_{60}$(OH)$_{12}$.

EXAMPLE 2

Example 1 was repeated, substituting C$_{60}$(OSO$_3$H)$_4$(OH)$_8$ for the C$_{60}$(OH)$_{12}$, to obtain a Nafion membrane doped with 1 wt % C$_{60}$(OSO$_3$H)$_4$(OH)$_8$.

EXAMPLE 3

Example 1 was repeated, substituting C$_{60}$ for the C$_{60}$(OH)$_{12}$, to obtain a Nafion membrane doped with 1 wt % C$_{60}$.

EXAMPLE 4

A composite membrane consisting of polyethylene oxide and 1 wt % C$_{60}$(OSO$_3$H)$_4$(OH)$_8$ was prepared by mixing the two ingredients together in solution and then solution casting the membrane on Teflon sheet.

EXAMPLE 5

Example 4 was repeated, this time increasing the amount of C$_{60}$(OSO$_3$H)$_4$(OH)$_8$ to 20 wt %

EXAMPLE 6

A composite membrane consisting of sulfonated polystyrene and 10 wt % C$_{60}$(OSO$_3$H)$_4$(OH)$_8$ was prepared by mixing the two ingredients together in solution and then solution casting the membrane on Teflon sheet.

The proton conductivities of the membranes prepared in accordance with Examples 1–5, as well as that of a bare Nafion membrane, were measured at 30° C. (i.e., low temperature) at varying relative humidities ranging from 20% to 100%. FIG. 1 is a graph showing these proton conductivities (σ) as a function of relative humidity (R.H.). In FIG. 1, plot a is that of the bare Nafion membrane; plot b corresponds to the Nafion membrane doped with 1 wt % $C_{60}$ (Example 3); plot c corresponds to the Nafion membrane doped with 1 wt % $C_{60}(OH)_{12}$ (Example 1); plot d corresponds to the Nafion membrane doped with 1 wt % $C_{60}(OSO_3H)_4(OH)_8$ (Example 2); plot e corresponds to the composite membrane of polyethylene oxide and 20 wt % $C_{60}(OSO_3H)_4(OH)_8$ (Example 5); and plot f corresponds to the composite membrane of polyethylene oxide and 1 wt % $C_{60}(OSO_3H)_4(OH)_8$ (Example 4). As can readily be seen from comparing plots b, c and d to plot a in FIG. 1, doping of the Nafion membrane with the fullerene materials, even in such small amounts as 1 wt %, significantly increases the low relative humidity proton conductivity of the membrane. Furthermore, a comparison of plots e and f in FIG. 1 shows that in the case of the polyesthylene oxide membrane, increasing the fullerene loading from 1 to 20 wt % greatly increases the proton conductivity of the membrane over the entire relative humidity range.

Figure 2:
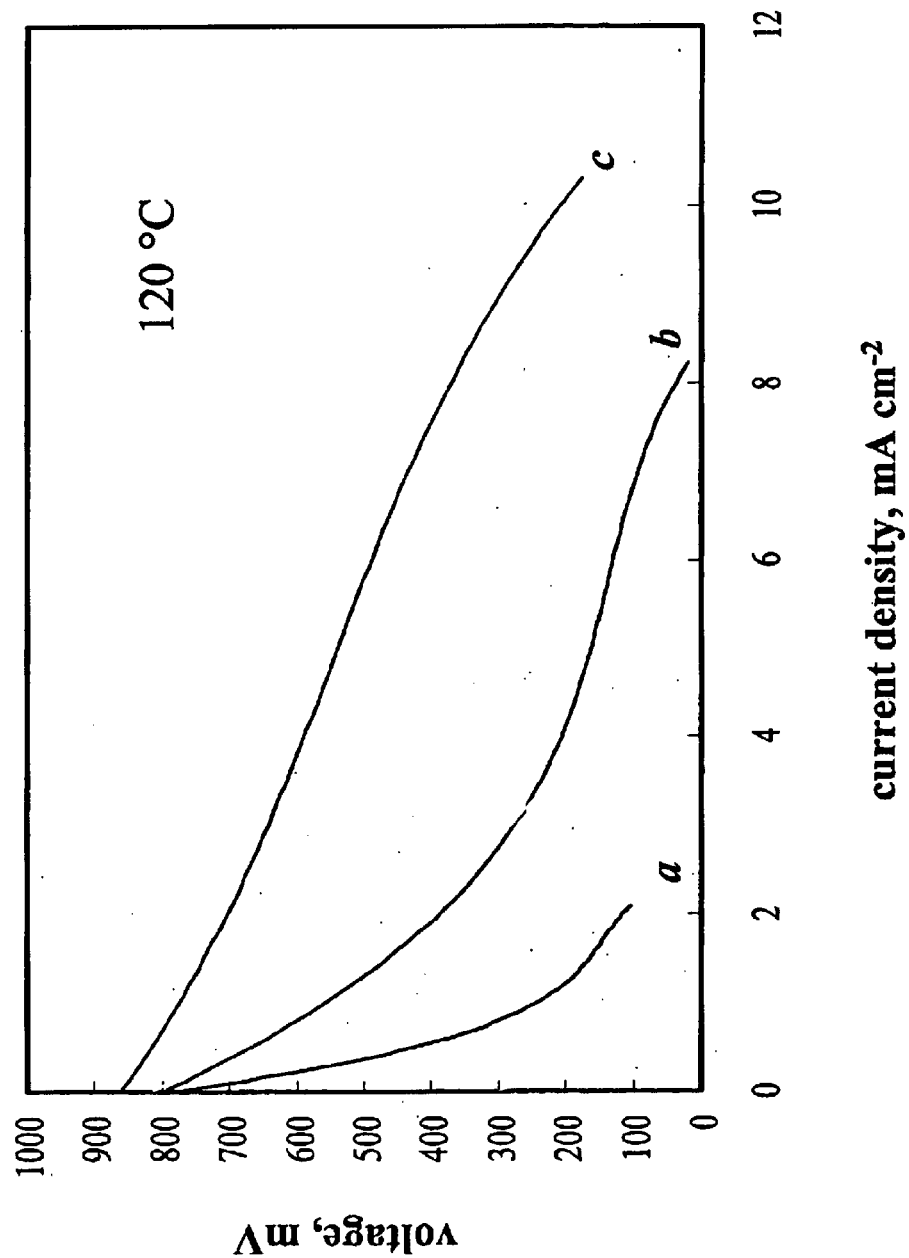
FIG. 2 is a graph showing the polarization curves of a PEM fuel cell measured at 120° C. under 25% relative humidity with a bare Nafion membrane (plot a) in comparison with Nafion membrane doped with 1% by weight of fullerene materials (plots b and c)

The PEM fuel cell performance of the membranes prepared in accordance with Examples 2 and 3, as well as that of a bare Nafion membrane, were measured at 120° C. (i.e., high temperature) and 25% relative humidity (i.e., low relative humidity), with the fuels being hydrogen and air, the pressure being ambient, and the platinum loading being 0.2 mg cm$^{-2}$. FIG. 2 is a graph showing the resulting polarization curves. In FIG. 2, plot a is that of a bare Nafion membrane; plot b corresponds to the Nafion membrane doped with 1 wt % $C_{60}$ (Example 3); and plot c corresponds to the Nafion membrane doped with 1 wt % $C_{60}(OSO_3H)_4(OH)_8$ (Example 2). It is clear from FIG. 2 that doping of the Nafion membrane with the fullerene materials, even in such small amounts as 1 wt %, significantly increases the high temperature, low relative humidity PEM fuel cell performance of the membrane.

The proton conductivities of the membranes prepared in accordance with Examples 1–3 and 6, as well as that of a bare Nafion membrane and a bare sulfonated polystyrene membrane, were also measured at 120° C. (i.e., high temperature) and 25% relative humidity (i.e., low relative humidity). The results are listed in Table 1, below.

TABLE 1

| Membrane | Proton Conductivity S cm$^{-1}$ |
|---|---|
| Bare Nafion | $7 \times 10^{-5}$ |
| Example 1 | $6 \times 10^{-4}$ |
| Example 2 | $3.7 \times 10^{-4}$ |
| Example 3 | $7 \times 10^{-4}$ |
| Bare Sulfonated Polystyrene | $10^{-6}$ |
| Example 6 | $10^{-5}$ |

From the proton conductivity data listed in Table 1, it can be seen that the incorporation of the fullerene materials into the membranes, in the case of both the Nafion membrane and the sulfonated polystyrene membrane, increases the high temperature, low relative humidity proton conductivity of the membrane by an order of magnitude.

Figure 3:
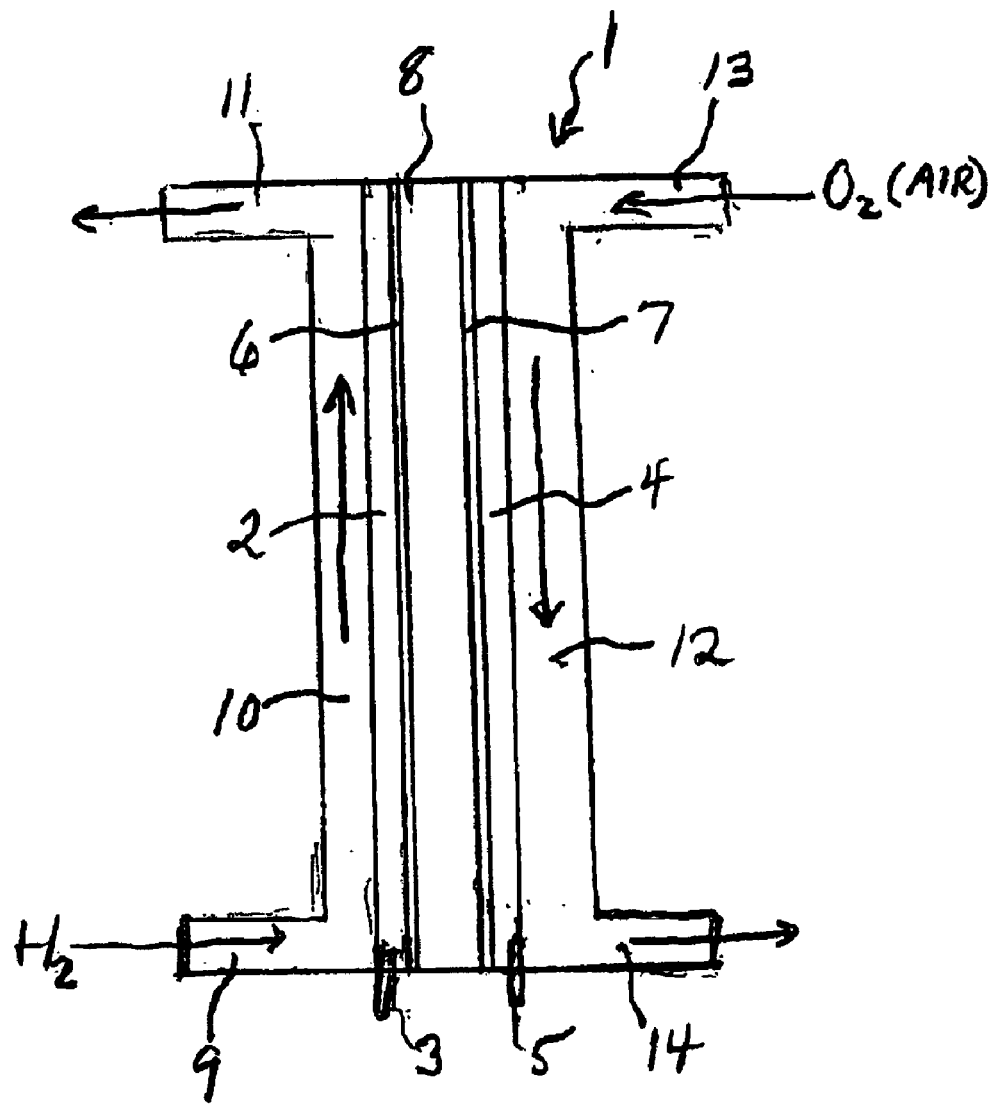
FIG. 3 is a sectional view showing a fuel cell that employs a proton conductor in accordance with the present invention.

It is apparent from the above test results that the proton conductors with enhanced low relative humidity proton conductivity properties in accordance with the present invention, are well suited for use as polymer electrolyte membranes in fuel cells. An example of a fuel cell using the proton conductor of this invention is shown in FIG. 3. Referring to FIG. 3, a fuel cell 1 has a hydrogen electrode 2 provided with a terminal 3, and an oxygen electrode 4 provided with a terminal 5. The hydrogen electrode 2 is provided on its inside face with a catalyst 6, and the oxygen electrode 4 is provided on its inside face with a catalyst 7. Positioned between the two electrodes adjacent to the catalysts 6 and 7 is a proton conductor 8 in accordance with the present invention. When the fuel cell is in use, hydrogen is supplied from an inlet 9 on the side of the hydrogen electrode 2, passes through a flow passage 10, and is discharged from an outlet 11. As hydrogen passes through the flow passage 10, protons are generated and migrate together with proton generated in the proton conductor 8 to the side of the oxygen electrode 4, where they react with oxygen (air) which has been supplied in a flow passage 12 from an inlet 13 and flows toward an outlet 14, to generate a desired electromotive force.

What is claimed is:

1. A method of enhancing the low relative humidity proton conductivity properties of a polymeric material for use as a polymer electrolyte membrane in a fuel cell, comprising incorporating into said polymeric material a proton conductivity enhancing amount of a proton conductive fullerene material, wherein said fullerene material is incorporated into said polymeric material by soaking said polymeric material in a solution containing fullerene material.

2. The method of claim 1, wherein said fullerene material contains bound water, or a plurality of functional groups with lone pair electrons, or a combination thereof.

3. The method of claim 2, wherein said fullerene material comprises $C_{60}$.

4. The method of claim 2, wherein said fullerene material comprises polyhydroxylated fullerene, polysulfonated fullerene, or polyhydroxylated polysulfonated fullerene.

5. The method of claim 1, wherein said polymeric material is a sulfonated perfluoro polymer, polyethylene oxide, polystyrene or sulfonated polystyrene.

6. A method of enhancing the low relative humidity proton conductivity properties of a polymeric material for use as a polymer electrolyte membrane in a fuel cell, comprising incorporating into said polymeric material a proton conductivity enhancing amount of a proton conductive fullerene material,
   wherein said fullerene material is covalently linked to said polymeric material through chemical reaction therewith.

7. The method of claim 6, wherein said fullerene material is incorporated in a minor amount relative to said polymeric material.

8. The method of claim 7, wherein said amount is less than about 30% by weight.

9. The method of claim 8, wherein said amount is within the range of from about 1 to about 10% by weight.

10. A method of enhancing the low relative humidity proton conductivity properties of a polymeric material for use as a polymer electrolyte membrane in a fuel cell, comprising incorporating into said polymeric material a proton conductivity enhancing amount of a proton conductive fullerene material,
    wherein said fullerene material is incorporated into said polymeric material using supercritical $CO_2$.

11. A method of enhancing the low relative humidity proton conductivity properties of a polymeric material for use as a polymer electrolyte membrane in a fuel cell, comprising incorporating into said polymeric material a proton conductivity enhancing amount of a proton conductive fullerene material, wherein said fullerene material is incorporated into said polymeric material in conjunction with a brittleness inhibiting amount of a plasticizer for said polymeric material.

12. A method of enhancing the low relative humidity proton conductivity properties of a polymeric material for use as a polymer electrolyte membrane in a fuel cell, comprising incorporating into said polymeric material a proton conductivity enhancing amount of a proton conductive fullerene material, wherein the incorporation of the requisite amount of said fullerene material into said polymeric material is aided by the addition of a fullerene-uptake adjuvant selected from the group consisting of silica, alumina and titania.

13. The method of claim 12, wherein said fullerene-uptake adjuvant is silica.

14. The method of claim 13, wherein said silica is added in an amount of up to about 10% by weight.

15. A proton conductor comprising a polymeric material and a minor amount of a proton conductive fullerene material incorporated into said polymeric material, said amount being effective to enhance the low relative humidity proton conductivity properties of said polymeric material, wherein said fullerene material is covalently linked to said polymeric material through chemical reaction therewith.

16. The proton conductor of claim 15, wherein said amount is less than about 30% by weight.

17. The proton conductor of claim 16, wherein said amount is within the range of from about 1 to about 10% by weight.

18. The proton conductor of claim 15, wherein said fullerene material contains bound water, or a plurality of functional groups with lone pair electrons, or a combination thereof.

19. The proton conductor of claim 18, wherein said fullerene material comprises $C_{60}$.

20. The proton conductor of claim 18, wherein said fullerene material comprises polyhydroxylated fullerene, polysulfonated fullerene, or polyhydroxylated polysulfonated fullerene.

21. A proton conductor comprising a polymeric material and a minor amount of a proton conductive fullerene material incorporated into said polymeric material, said amount being effective to enhance the low relative humidity proton conductivity properties of said polymeric material, further including a brittleness inhibiting amount of a plasticizer for said polymeric material.

22. The proton conductor of claim 21, wherein said polymeric material is a sulfonated perfluoro polymer, polyethylene oxide, polystyrene or sulfonated polystyrene.

23. A proton conductor comprising a polymeric material and a minor amount of a proton conductive fullerene material incorporated into said polymeric material, said amount being effective to enhance the low relative humidity proton conductivity properties of said polymeric material, further including a fullerene-uptake adjuvant selected from the group consisting of silica, alumina and titania.

24. The proton conductor of claim 23, wherein said fullerene-uptake adjuvant is silica.

25. The proton conductor of claim 24, wherein said silica is present in an amount of up to about 10% by weight.

26. A fuel cell comprising a first electrode, a second electrode, and a proton conductor that is positioned between the first and second electrodes, said proton conductor comprising a polymeric material and a minor amount of a proton conductive fullerene material incorporated into said polymeric material, said amount being effective to enhance the low relative humidity proton conductivity properties of said polymeric material, wherein said fullerene material is covalently linked to said polymeric material through chemical reaction therewith.

27. The fuel cell of claim 26, wherein said fullerene material contains bound water, or a plurality of functional groups with lone pair electrons, or a combination thereof.

28. The fuel cell of claim 27, wherein said fullerene material comprises $C_{60}$.

29. The fuel cell of claim 27, wherein said fullerene material comprises polyhydroxylated fullerene, polysulfonated fullerene, or polyhydroxylated polysulfonated fullerene.

30. The fuel cell of claim 26, wherein said polymeric material is a sulfonated perfluoro polymer, polyethylene oxide, polystyrene or sulfonated polystyrene.

31. A fuel cell comprising a first electrode, a second electrode, and a proton conductor that is positioned between the first and second electrodes, said proton conductor comprising a polymeric material and a minor amount of a proton conductive fullerene material incorporated into said polymeric material, said amount being effective to enhance the low relative humidity proton conductivity properties of said polymeric material, wherein said proton conductor further includes a brittleness inhibiting amount of a plasticizer for said polymeric material.

32. The fuel cell of claim 31, wherein said amount is less than about 30% by weight.

33. The fuel cell of claim 32, wherein said amount is within the range of from about 1 to about 10% by weight.

34. A fuel cell comprising a first electrode, a second electrode, and a proton conductor that is positioned between the first and second electrodes, said proton conductor comprising a polymeric material and a minor amount of a proton conductive fullerene material incorporated into said polymeric material, said amount being effective to enhance the low relative humidity proton conductivity properties of said polymeric material, wherein said proton conductor further includes a fullerene-uptake adjuvant selected from the group consisting of silica, alumina and titania.

35. The fuel cell of claim 34, wherein said fullerene-uptake adjuvant is silica.

36. The fuel cell of claim 35, wherein said silica is present in said proton conductor in an amount of up to about 10% by weight.

* * * * *